United States Patent [19]
Streitenberger et al.

[11] Patent Number: 5,657,485
[45] Date of Patent: Aug. 12, 1997

[54] PROGRAM CONTROL OPERATION TO EXECUTE A LOOP PROCESSING NOT IMMEDIATELY FOLLOWING A LOOP INSTRUCTION

[75] Inventors: Robert Streitenberger; Hiroyuki Kawai; Yoshitsugu Inoue, all of Itami, Japan

[73] Assignee: Mitsubishi Denki Kabushiki Kaisha, Tokyo, Japan

[21] Appl. No.: 509,940

[22] Filed: Aug. 1, 1995

[30] Foreign Application Priority Data

Aug. 18, 1994 [JP] Japan ................................. 6-194037

[51] Int. Cl.$^6$ ....................................... G06F 9/32
[52] U.S. Cl. ..................... 395/595; 395/387; 395/588; 395/421.07
[58] Field of Search .................... 395/375, 421.07, 395/775, 387, 588, 595

[56] References Cited

U.S. PATENT DOCUMENTS

| | | | |
|---|---|---|---|
| 3,766,527 | 10/1973 | Briley | 395/383 |
| 4,876,642 | 10/1989 | Gibson | 395/250 |
| 4,910,664 | 3/1990 | Arizono | 395/588 |
| 4,994,732 | 2/1991 | Jeffrey et al. | 324/73.1 |
| 5,117,498 | 5/1992 | Miller et al. | 395/588 |
| 5,375,238 | 12/1994 | Ooi | 395/588 |

OTHER PUBLICATIONS

Motorola DSP56000/DSP56001 User's Manual, pp. 7-20–7-22.

*Primary Examiner*—Kenneth S. Kim
*Attorney, Agent, or Firm*—Oblon, Spivak, McClelland, Maier & Neustadt, P.C.

[57] ABSTRACT

The present invention is directed to a program control unit which enables a program control to achieve an efficient loop processing which does not immediately follow a loop instruction and which contains a start address and end address. In the program control unit, the start address and end address of a loop processing are stored in a register (start) (7) and a register (end) (8), respectively, in synchronization with a clock t1. The stored data "start" of the register (7) and the stored data "end" of the register (8) are inputted to a comparator (12) and a comparator (11), respectively. The comparator (12) compares the output from a delay program counter (18) with the data "start", and sets a flag f start when the comparison result indicates agreement and otherwise resets it. The comparator (11) compares the output from a delay program counter (18) with the data "end", and sets a flag f end when the comparison result indicates agreement and otherwise resets it.

10 Claims, 16 Drawing Sheets

```
...:>                ...
20:>       load3,1c1;
21:>       loop 1c1,Start_1,End_1
22:>       load 3,1c2;
23:>       loop 1c2,Start_2,End_2
...:>
37:> Start_1: {First Instruction(Block1)}
...:>
40:> Start_2: {First Instruction(Block2)}
...:>              ...
42:> End_2:    {Last Instruction(Block2)}
...:>              ...
45:> End_1:    {Last Instruction(Block1)}
...:>              ...
```

```
...:>               ...
 20:>           load 3,ic;
 21:>           loop lc,Start,End;
...:>               ...
 40:> Start:   {First Instruction}  ⎤
 41:>               ...              ⎬ B1
 42:> End;    {Last Instruction}    ⎦
...:>               ...
```

FIG. 7

```
20:>        load 2,lc;
21:>        loop lc,Start,End;
22:>           ...
37:>        mulacc a[0],0;        ⎫
38:>        mulacc a[0],wr[0];    ⎬ BlockA
39:>        mulacc a[1],wr[1];    ⎭
40:> Start: mulacc a[i,1],wr[0];  ⎫
41:>        mulacc a[i,1],wr[1];  ⎬ BlockB[i]
42:> End:   mulacc a[i,-1],wr[2]; ⎭
43:>        mulacc a[i,1],wr[0];  ⎫
44:>        mulacc a[i,1],wr[1];  ⎬ BlockC
45:>        mulacc a[i],0;        ⎭
```

FIG. 8

```
...:>           ...
20:>            load3,lc1;
21:>            loop lc1,Start_1,End_1
22:>            load 3,lc2;
23:>            loop lc2,Start_2,End_2
...:>
37:> Start_1: {First Instruction(Block1)}   ⎫
...:>                                        ⎪
40:> Start_2: {First Instruction(Block2)} ⎫  ⎪
...:>              ...                     ⎬B12⎬B11
42:> End_2:   {Last Instruction(Block2)}  ⎭  ⎪
...:>              ...                        ⎪
45:> End_1:   {Last Instruction(Block1)}     ⎭
...:>              ...
```

```
  ...:>           ...
   20:>           load 5,lc1;
   21:>           loop lc1,Start_1,End_1;
   22:>           load 2,lc2;
   23:>           loop lc2,Start_2,End_2;
  ...:>           ...
   37:> Start_1:  mulacc a[0],0;        ⎫
   38:>           mulacc a[0],wr[0];    ⎬ Block1
   39:>           mulacc a[1],wr[1];    ⎭
   40:> Start_2:  mulacc a[i,1],wr[0];  ⎫
   41:>           mulacc a[i,1],wr[1];  ⎬ Block2
   42:> End_2:    mulacc a[i,-1],wr[2]; ⎭
   43:>           mulacc a[i,1],wr[0];  ⎫
   44:>           mulacc a[i,1],wr[1];  ⎬ Block3
   45:> End_1:    mulacc a[i],0;        ⎭
  ...:>           ...
```

FIG. 17

```
...:>              ...
 38:>        load3,lc;
 39:>        loop lc,End
 40:>        {First Indstruction} ⎤
...:>              ...              ⎥
 42:> End:   {Last Instruction}  ⎦
 43:>              ...
```

FIG. 18

```
...:>              ...
 33:>        load 3,lc1;
 34:>        load 3,lc2;
 35:>        loop lc1,End_1
 36:>        {First Instruction(Block1)} ⎤
...:>              ...                    ⎥
 39:>        loop lc2,End_2               ⎥
 40:>        {First Instruction(Block2)} ⎤⎥
 41:>              ...                    ⎥⎥
 42:> End_2: {Last Instruction(Block2)}⎦⎥
...:>              ...                    ⎥
 45:> End_1: {Last Instruction(Block1)}  ⎦
 46:>              ...
```

FIG. 19

Convolution Mask

|   |   |   |   |   |   |   |   |
|---|---|---|---|---|---|---|---|
| 0 | 0  | 0  | 0  | 0  | 0  | 0  | 0 |
| 0 | 1  | 2  | 3  | 4  | 5  | 6  | 0 |
| 0 | 7  | 8  | 9  | 10 | 11 | 12 | 0 |
| 0 | 13 | 14 | 15 | 16 | 17 | 18 | 0 |
| 0 | 19 | 20 | 21 | 22 | 23 | 24 | 0 |
| 0 | 25 | 26 | 27 | 28 | 29 | 30 | 0 |
| 0 | 31 | 32 | 33 | 34 | 35 | 36 | 0 |
| 0 | 0  | 0  | 0  | 0  | 0  | 0  | 0 |

FIG. 20

Line Label Instruction

```
35:>           load  4,lc1;
36:>           mulacc a[0],0;            ┐
37:>           mulacc a[0],wr[0];        │ BlockA
38:>           mulacc a[1],wr[1];        ┘
39:>           loop  lc1,End;            ← Loop Instruction
40:>           mulacc a[i,1],wr[0];      ┐
41:>           mulacc a[i,1],wr[1];      │ BlockB[i]
42:> End:     mulacc a[i,-1],wr[2];     ┘
43:>           mulacc a[i,1],wr[0];      ┐
44:>           mulacc a[i,1],wr[1];      │ BlockC
45:>           mulacc a[i],0;            ┘
```

PROGRAM CONTROL OPERATION TO EXECUTE A LOOP PROCESSING NOT IMMEDIATELY FOLLOWING A LOOP INSTRUCTION

BACKGROUND OF THE INVENTION

1. Field of the Invention

The present invention relates to a program control unit and a program control method to control execution of a program.

2. Description of the Background Art

For real-time applications, a smooth flow of instructions is imperative. When, for example, a filter algorithm is implemented with a processor of any kind, the overlapped scanning of the applied matrices provides the best results in terms of speed, if the vertical and horizontal scannings are executed without interruptions by a repetition of the individual loop instruction.

Therefore, a program control unit for controlling execution of a program generally allows a loop instruction to be executed so that a repeated processing can be simply performed.

In the case of a single loop, the syntax of a standard loop instruction is shown in FIG. 17, where "lc" represents a loop counter and "End" represents an address of the last instruction of the repeated loop block.

This syntax includes one severe restriction to the programmer: The loop instruction has to be exactly one line above the first line of the loop block (line 40 of FIG. 17), i.e., to be placed on line 39 of FIG. 17.

The standard nesting of two loops is shown in FIG. 18.

As can be seen from FIG. 18, a loop block Block1 positioned on lines 36 to 45 surrounds another loop block Block2 positioned on lines 40 to 42. The loop instruction (on line 39) of the inner loop block Block2 is repeated every time the surrounding block Block1 is executed.

Actually, the loop instructions on lines 35 and 39 have to be executed only one time for the transfer of the information (loop counter, start address and end address).

Nonetheless, the loop instruction of Block2 is repeated every time the loop block Block1 is executed, and accordingly, (lc1−1) cycles are executed inefficiently. This inefficient execution of the loop instruction has a profound ill effect on performance of a filter application and the like. A detailed discussion will follow.

The effects are best illustrated by an example of a filter application. If a matrix of pixel data is applied to a convolution mask of three-to-three elements (e.g. "Laplacian Edge Detection"), special care has to be taken at the start and end of each horizontal scanning line. For extrapolation of the border pixel, "virtual" zeros are inserted along the borders, as shown in FIG. 19.

The inner pixels of the frame are easily processed by using an indexed array for the addressing of the data stack. If the mask is shifted, the index is incremented. Thus, a repeated block, i.e., a loop processing, can be applied, for the horizontal scanning of the mask. For the borders of the mask, however, the blocks are irregular, due to the insertion of the zeros.

This entails a separate block (BlockA, BlockB and BlockC) at the start and end of each frame line to be processed in a program as shown in FIG. 20, for the mask processing of the pixels of FIG. 19. FIG. 20 shows a program for implementing a horizontal scanning, in which pixel data Pixel1 to Pixel6 are stored in indexed arrays a[0] to a[5]. In the program, a[i, 1] represents incrementing a variable i by 1 after fetching the value from the array a[i], and a[i, −1] represents decrementing a variable i by 1 after fetching the data value from the array a[i]. Further, wr[0] to wr[2] represent arrays storing the values of the first line of the mask, "load" represents a data load instruction and "mulacc" represents an operational instruction. The variable i has an initial value "1", not shown in FIG. 20.

If the standard loop instruction is applied, it has to be positioned between the block BlockA and a loop block BlockB (on line 39 of FIG. 20). The loop instruction on line 39 causes an irregularity, since not three but four steps including the loop instruction are required to process the border pixel before BlockB, which disables a real-time processing of the complete frame.

Furthermore, since an actual filtering processing requires a horizontal scanning as an inner loop and a vertical scanning as an outer loop, the loop instruction for the horizontal scanning has to be repeated every time the outer loop (vertical scanning) is executed, resulting in an increase of the overall processing time.

In the background art program control unit, the loop instruction as above causes a problem of inefficiency of a program and an increase of processing time in such an application processing as filtering processing.

SUMMARY OF THE INVENTION

The first aspect of the present invention is directed to a program control unit for controlling execution of a program which contains a plurality of instructions each having a corresponding address, and the program control unit requires that a loop instruction defining a start address, an end address and the number of iterations of a loop processing and a group of loop executing instructions containing at least one instruction located between the start address and the end address are located in the program to perform the loop processing.

According to the first aspect, the program control unit comprises: program counter output means for incrementing a program counter defining an address of the current instruction at prescribed time intervals and outputting the incremented program counter; start address storage means for storing the start address; end address storage means for storing the end address; number of iterations storage means for storing the number of iterations; and loop control means for setting the program counter so that the group of loop executing instructions should be repeated the number of iterations times by recognizing the start of the loop processing on the basis of a comparison result between the program counter and the start address and the end of the loop processing on the basis of a comparison result between the program counter and the end address.

The second aspect of the present invention is directed to a program control unit for controlling execution of a program which contains a plurality of instructions each having a corresponding address, and the program control unit requires that first to n-th (n≧2) loop instructions defining respective start addresses, respective end addresses and respective numbers of iterations of first to n-th loop processings which are nested in first to n-th order and first to n-th groups of loop executing instructions each containing at least one instruction located between the start address and the end address in the respective first to n-th loop instructions are located in the program to perform the loop processings.

According to the second aspect, the program control unit comprises: program counter output means for incrementing a program counter defining an address of the current instruction at prescribed time intervals and outputting the incremented program counter; first to n-th start address storage means for storing the start addresses of the first to n-th loop processings as first to n-th start addresses respectively; first to n-th end address storage means for storing the end addresses of the first to n-th loop processings as first to n-th end addresses respectively; first to n-th numbers of iterations storage means for storing the numbers of iterations of the first to n-th loop processings as first to n-th numbers of iterations respectively; and start address selecting means for selecting one of the first to n-th start addresses as a selected start address on the basis of a selection control signal; end address selecting means for selecting one of the first to n-th end addresses as a selected end address on the basis of the selection control signal; number of iterations selecting means for selecting one of the first to n-th numbers of iterations as a selected number of iterations on the basis of the selection control signal; selection control signal output means for outputting the selection control signal indicating a current loop processing on the basis of a comparison result between the program counter and the selected start address and a comparison result between the program counter and the selected end address; and loop control means for setting the program counter so that the current loop processing should be repeated the selected number of iterations times by recognizing the start of the loop processing corresponding to the selected start address on the basis of the start address comparison result and the end of the loop processing corresponding to the selected end address by the end address comparison result.

The third aspect of the present invention is directed to a program control method of controlling execution of a program which contains a plurality of instructions each having a corresponding address, and the program control method requires that a loop instruction defining a start address, an end address and the number of iterations of a loop processing and a group of loop executing instructions containing at least one instruction located between the start address and the end address are located in the program to perform the loop processing.

According to the third aspect, the program control method comprises steps of: (a) incrementing a program counter which defines an address of the current instruction at prescribed time intervals from a first address of the program; (b) storing the start address, the end address and the number of iterations when an instruction corresponding to an address which is indicated by the program counter is the loop instruction; (c) setting the program counter so that the group of loop executing instructions should be repeated the number of iterations times by recognizing the start of the loop processing on the basis a comparison result between the program counter and the start address stored in the step (b) and the end of the loop processing on the basis of a comparison result between the program counter and the end address stored in the step (b).

In the program control unit in accordance with the first aspect of the present invention, the loop instruction can be located at any place before the group of loop executing instructions in the program since the loop control means recognizes the start of the loop processing on the basis of the comparison result between the program counter and the start address.

Since the loop instruction is placed in a location where it will not hinder the execution of loop processing, the efficiency of the loop processing is improved.

In the program control unit in accordance with the second aspect of the present invention, the selection control signal output means outputs the selection control signal to indicate the current loop processing on the basis of the comparison result between the program counter and the selected start address and the comparison result between the program counter and the selected end address, and the loop control means sets the program counter so that the current loop processing should be repeated the selected number of iterations times by recognizing the start of the loop processing corresponding to the selected start address on the basis of the comparison result between the program counter and the selected start address and the end of the loop processing corresponding to the selected end address on the basis of the comparison result between the program counter and the selected end address.

Therefore, the first to n-th loop instructions can be located at any place before the respective first to n-th groups of loop executing instructions in the program.

Since the first to n-th loop instructions is placed outside the nesting structure of the respective first to n-th groups of loop executing instructions, the efficiency of the nested first to n-th loop processings is improved.

In the step (c) of the program control method in accordance with the third aspect of the present invention, the program counter is set so that the group of loop executing instructions should be repeated the number of iterations times by recognizing the start of the loop processing on the basis of the comparison result between said program counter and said start address and the end of the loop processing on the basis of the comparison result between said program counter and said end address.

Therefore, the loop instruction can be located at any place before the group of loop executing instructions in the program.

Since the loop instruction is placed in a location where it will not hinder the execution of the loop processing, the efficiency of the loop processing is improved.

An object of the present invention is to provide a program control unit and a program control method, which enable a program control to improve efficiency of a loop processing.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 illustrates an example of a program which is controlled its execution by a program control unit in accordance with a first preferred embodiment of the present invention;

FIG. 7 illustrates another example of a program which is controlled its execution by a program control unit in accordance with the first preferred embodiment of the present invention;

FIG. 8 illustrates an example of a program which is controlled its execution by a program control unit in accordance with a second preferred embodiment of the present invention;

FIG. 17 illustrates an example of a program which is controlled its execution by a background art program control unit;

FIG. 18 illustrates another example of a program which is controlled its execution by a background art program control unit;

FIG. 19 illustrates an example of a mask processing of pixels; and

FIG. 20 illustrates an example of a program which is controlled its execution by a background art program control unit.

DESCRIPTION OF THE PREFERRED EMBODIMENTS

<The First Preferred Embodiment>

FIG. 1 illustrates an example of a program which is controlled in its execution by a program control unit in accordance with the first preferred embodiment of the present invention. FIG. 1 shows an example of a single loop instruction, corresponding to FIG. 17 in the background art.

The program control unit in accordance with the first embodiment allows a loop instruction to indicate a loop block by defining the start address and end address thereof. Therefore, the loop instruction may be located at any place before the loop block, being unrestricted. In FIG. 1, the loop block B1 is placed on address Nos. 40 to 42, and the loop instruction "loop lc, Start, End" is placed on address No. 21 preceding the loop block B1 by 20.

As shown in FIG. 1, the start address Start and the end address End of the loop instruction are assigned independently.

In comparison between FIG. 1 and FIG. 17, the overall processing time is not influenced by the single loop instruction, but the regularity required for real-time processing is maintained.

That enables a smooth processing of any block-segmented algorithms.

Figures 14, 15:
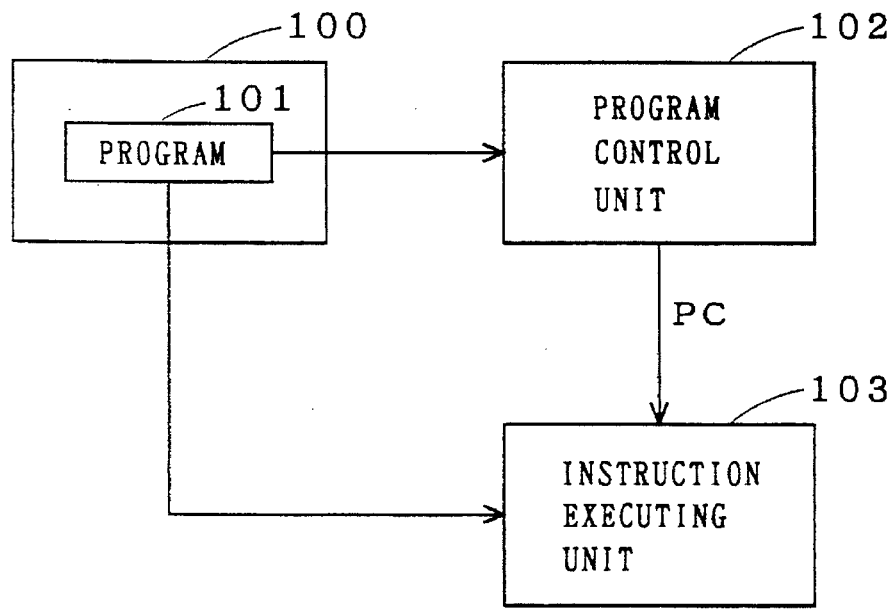
FIG. 14 illustrates an example of a program which is controlled its execution by a program control unit in accordance with the second preferred embodiment of the present invention.
FIG. 15 illustrates an overall structure of a program executing system.

FIG. 15 illustrates an overall structure of a program executing system, including the program control unit in accordance with the first embodiment. As shown in FIG. 15, a memory 100 stores a program 101 containing a plurality of instructions corresponding to the addresses (line Nos of FIG. 1), respectively, a program control unit 102 increments a program counter PC from the first address of the program 101 at prescribed intervals and outputs the incremented program counter PC to the instruction executing unit 103. In this execution, when the program control unit 102 recognizes a loop processing, it resets the program counter PC so that the loop processing should be executed the prescribed number of times. The instruction executing unit 103 executes the instruction corresponding to the address indicated by the program counter PC.

Figure 2:
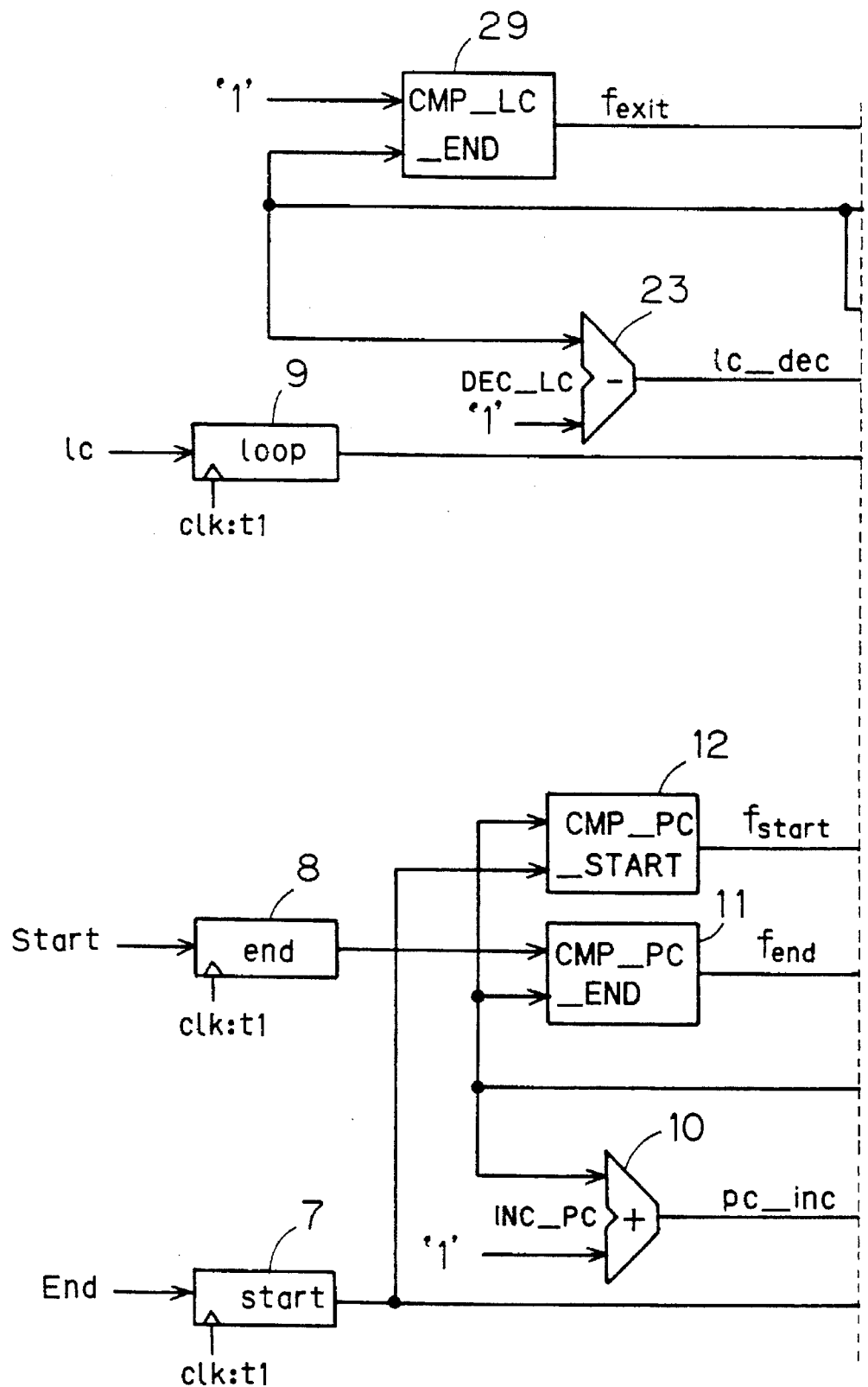
FIGS. 2 and 3 together are circuit diagrams cooperatively showing a configuration of the program control unit in accordance with the first preferred embodiment of the present invention.
Figure 3:
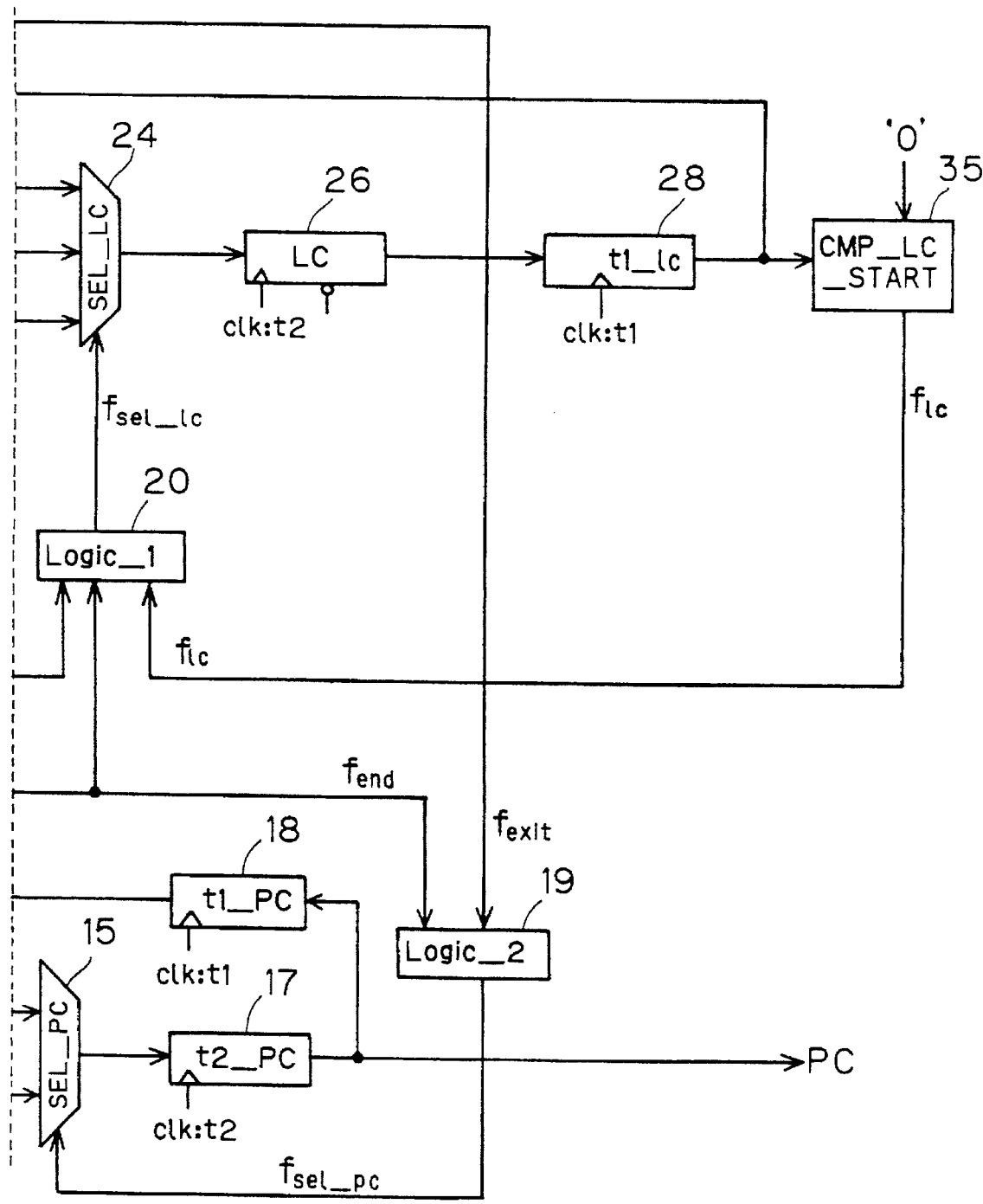
Figure 4:
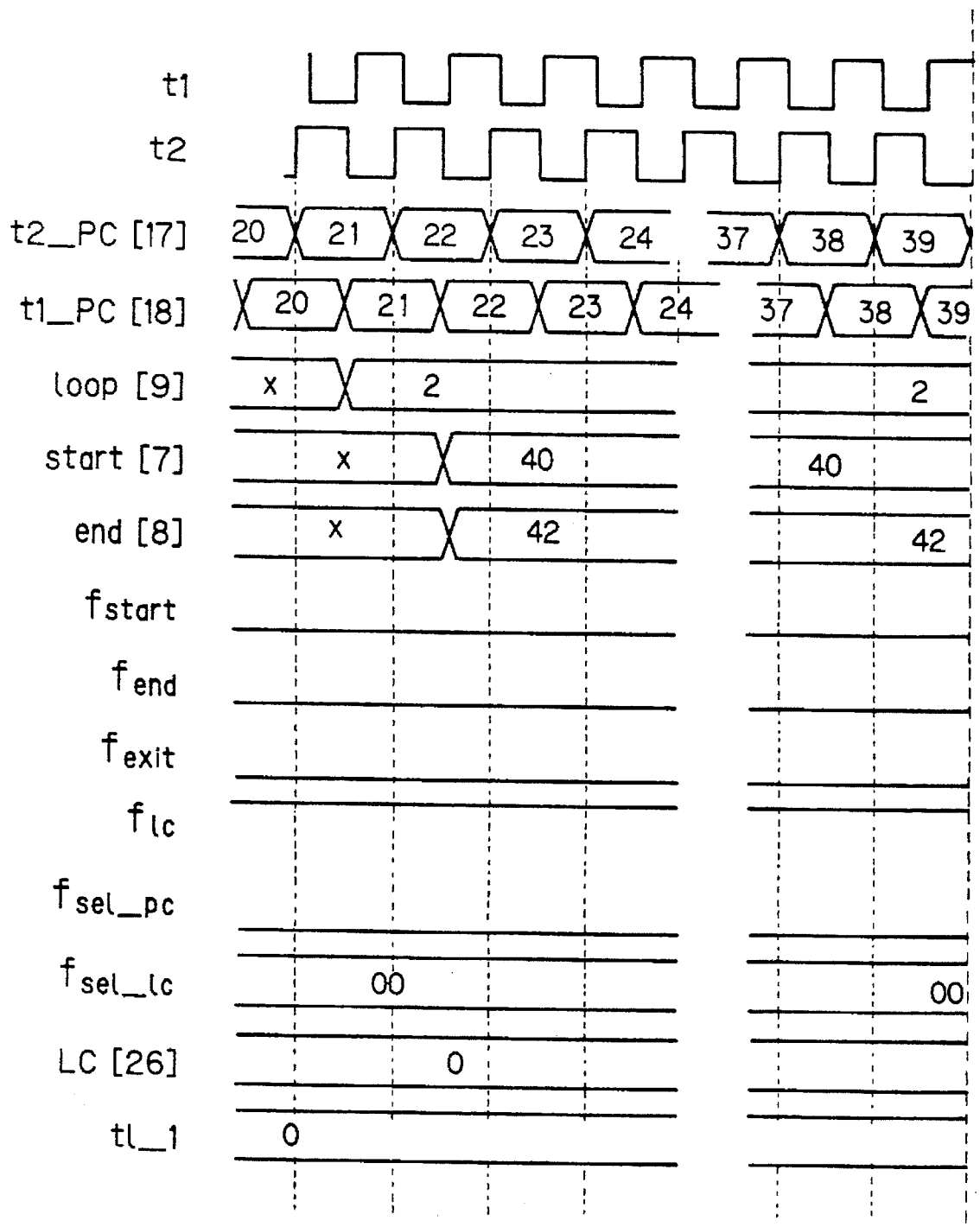
FIGS. 4, 5 and 6 together are waveform charts showing an operation of the program control unit in accordance with the first preferred embodiment of the present invention.
Figure 5:
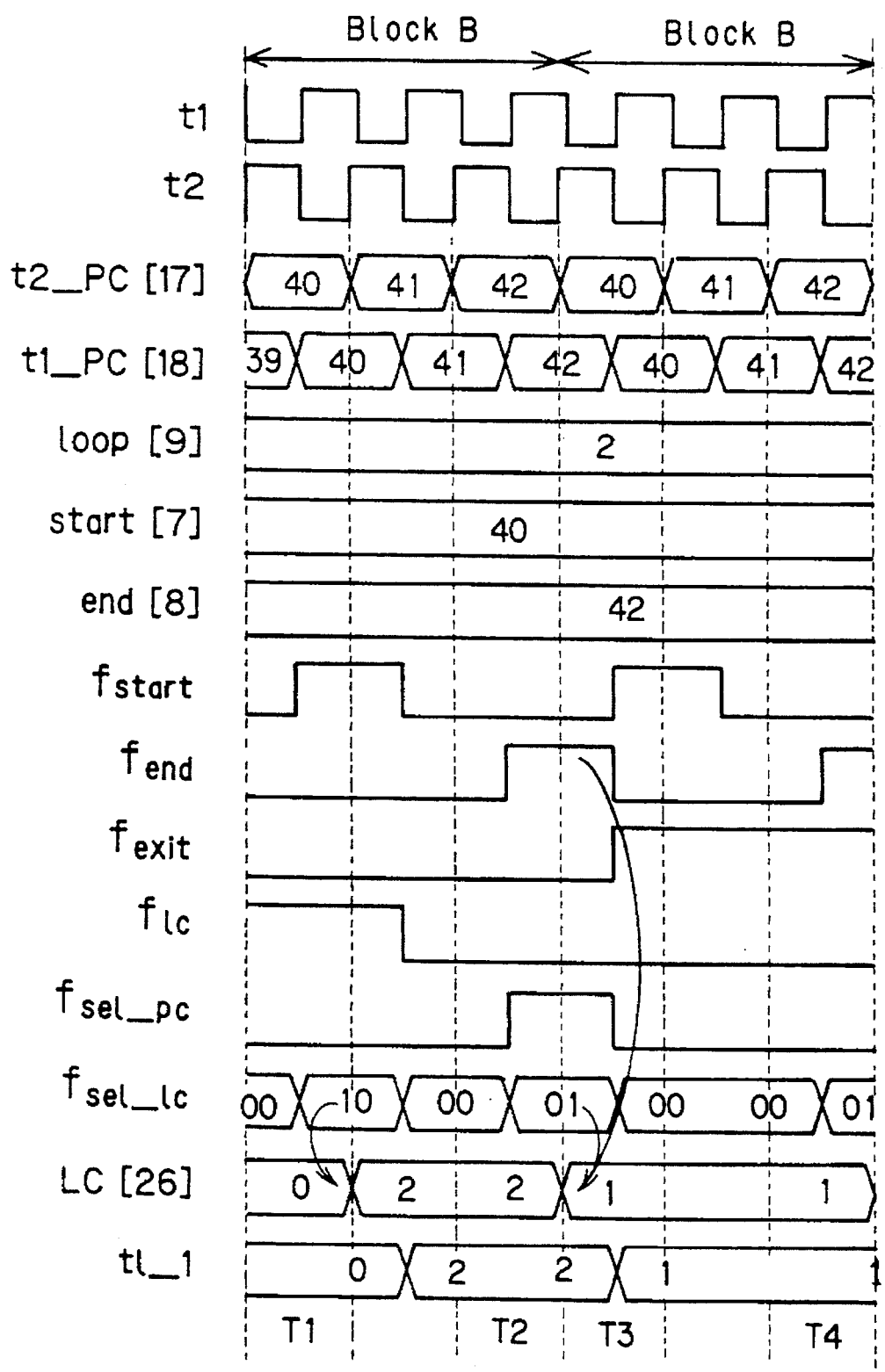
Figure 6:
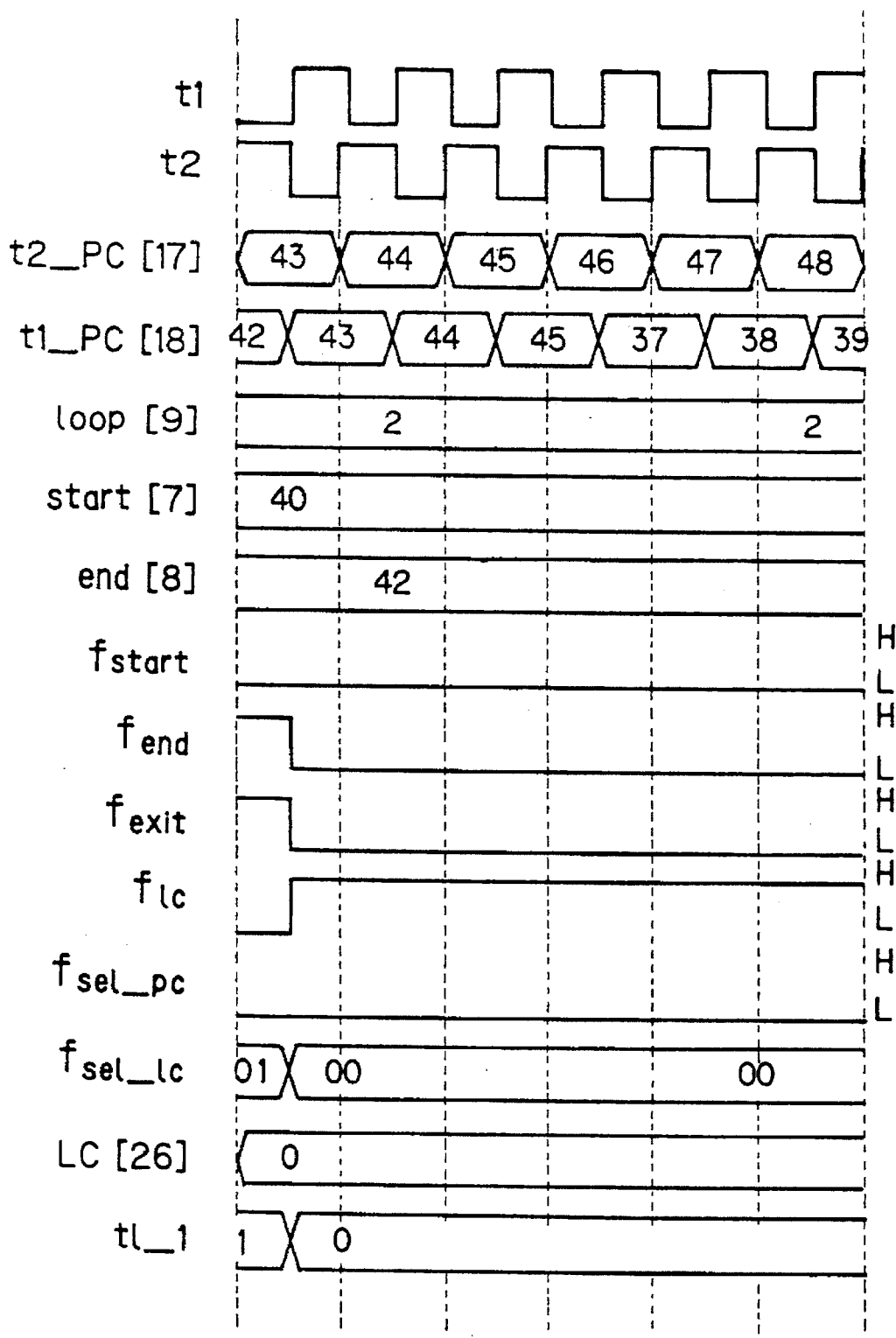

FIGS. 2 and 3 are circuit diagrams cooperatively showing an internal configuration of the program control unit in accordance with the first embodiment. The program control unit in accordance with the first embodiment allows execution of the single loop instruction of FIG. 1. FIGS. 4 to 6 are signal waveform charts for illustrating the operation. To keep the waveform small and simple, only two iterations have been selected. Two non-overlapping clocks, t1 and t2, are listed at the top of timing chart. FIGS. 4 to 6 show the execution of a program of FIG. 7. FIG. 7 corresponds to FIG. 20 in the background art.

A register (t2_PC) 17 and a register (t1_PC) 18 latch the program counter PC of the program control unit in synchronization with the clocks t2 and t1, respectively. The program counter PC of the register 17 is outputted to the instruction executing unit 103.

The listing of FIG. 7 starts at line No. "20", where the loop register is loaded with the value "2".

In the case where no pipelining is applied, the load instructions take effect at the next cycle of t2.

Accordingly, a register (loop) 9 for storing the loop variable lc stores the value "2"in synchronization with the clock t1, holding the number of iterations of the loop block BlockB. An output signal from the register 9 is connected to a selector (SEL_LC) 24, which drives a variable loop counter (LC) 26 in synchronization with the clock t2, and an output from the variable loop counter 26 is stored in a register (t1_lc) 28 in synchronization with the clock t1.

An output from the register 28 is connected to a decrementor (DEC_LC) 23, a comparator (CMP_LC_START) 35 and a comparator (CMP_LC_END) 29.

The comparator 29 sets a flag f exit (at H ("1")) when a loop counter value of the register 28 is "1", and otherwise resets it (at L ("0")). The comparator 35 sets the flag f lc when the loop counter value of the register 28 is "0", and otherwise resets it.

A loop counter value lc_dec which is decremented by the decrementor 23 is the second input to the selector 24.

A control signal f sel_lc is generated by a logic circuit 20, and will be discussed later.

At line No. 21 of the program of FIG. 7, a loop instruction is applied. The loop instruction includes the information regarding the start and end of the loop block.

For easier handling during debugging as well as better readability of the program, labels are applied instead of absolute addresses.

In the case of FIG. 7, the label "Start" corresponds to line No. 40, whereas the label "End" corresponds to line No. 42.

The start address and the end address are stored in a register (start) 7 and a register (end) 8, respectively, in synchronization with the clock t1.

An output from the delay program counter 18 is connected to an incrementer (INC_PC) 10, a comparator (CMP_PC_START) 12 and a comparator (CMP_PC_END) 11.

An output signal pc_inc from the incrementer 10 and the stored data "start" of the register 7 are the inputs to a selector (SEL_PC) 15, which drives the program counter 17.

The stored data "start" of the register 7 and the stored data "end" of the register 8 are the inputs to the comparator 12 and the comparator 11. The comparator 12 compares the output from the delay program counter 18 with the stored data "start" of the register 7, and sets a flag f start when the delayed program counter value is equal to "start", and otherwise resets it. The comparator 11 compares the output from the delay program counter 18 and the stored data "end" of the register 8, and sets a flag f end when the delayed program counter value is equal to "end" and otherwise resets it.

A selection control flag f sel_pc for the selector (SEL_PC) 15 is generated by a logic circuit (Logic_2) 19 with the sources f end and f exit. A truth table of the control system of the logic circuit 19 and the selection (select1) of the selector 15 is shown in Table 1;

TABLE 1

| f end | f exit | f sel_pc | Select1 |
|---|---|---|---|
| 0 | ? | 0 | pc_inc |
| 1 | 0 | 1 | start |
| 1 | 1 | 0 | pc_inc |

?: don't care

As is clear from Table 1, when the flag f end is "0", regardless of the value of the flag f exit, the selection control flag f sel_pc is set at "0" and the selector 15 selects the output signal pc_inc of the incrementer 10. When the flag f end is "1" and the flag f exit is "0", the selection control flag f sel_pc is set at "1" and the selector 15 selects the stored data "start" of the register 7, and when the flag f end is "1" and the flag f exit is "1", the selection control flag f sel_pc is set at "0" and the selector 15 selects the output signal pc_inc of the incrementer 10.

On the other hand, the selection control flag f sel_lc for the selector 24 is generated by the logic circuit (Logic_1) 20 with the sources f start, f end and flc. A truth table of the control system of the logic circuit 20 and the selection (select2) of the selector 24 is shown in Table 2;

TABLE 2

| f start | f lc | f end | f sel_lc | Select2 |
|---|---|---|---|---|
| default | | | 00 | lc |
| ? | ? | 1 | 01 | lc_dec |
| 1 | 1 | 0 | 10 | loop |

?: don't care

As is clear from Table 2, the selection control flag f sel_lc is set at "00" and the selector 24 selects the output lc from the register 28 by default. When the flag f end is "1", regardless of the flags f start and f lc, the selection control flag f sel_lc is set at "01" and the selector 24 selects the output lc_dec of the decrementer 23. When the flag f end is "0" and both the flags f start and f lc are "1", the selection control flag f sel_lc is set at "10" and the selector 24 selects the stored data "loop" of the register 9.

Until the program reaches line No. 37, the program counter value is constantly incremented by the output from the incrementer 10. Since the loop counter value is reset at the start of each program, flag f lc is already set.

During a period T1, when the program counter value PC is equal to "40", the flag f start is set in synchronization with the clock t1. Since the flags f start and f lc are set and the flag f end is already reset, according to Table 2, the selection control flag f sel_lc is set to "10" and the selector 24 selects the stored data "loop" of the register 9.

Accordingly, the variable loop counter 26 is loaded with "2", the stored data "loop", from the register 9, and all of the flags are reset one cycle later.

During a period T2, when the program counter PC is equal to "42", the flag f end is set in synchronization with the clock t1.

Since the flag f exit is already reset, according to Table 1, the logic circuit 19 sets the flag f sel_pc and the selector 15 selects the data "start". The program counters 17 and 18 are loaded with "40", the stored data "start", from the register 7.

Simultaneously, the variable loop counter 26 is loaded with the value decremented by the decrementer 23, "1", through the selector 24, and in consequence the comparator 29 sets the flag f exit.

During a period T3, when the program counter PC is equal to "40", the flag f start is set again. In contrast to the first setting of the flag f start, the flag f lc is already reset at this time, and as a result, the flag f sel_lc is reset.

During a period T4, when the program counter PC is equal to "42", the flag f end is set again. In contrast to the first setting of the flag f end, the flag f exit is already set at this time, and as a result, the selection control flag f sel_pc of the logic circuit 19 is not set.

Accordingly, the selector 15 selects the output of the incrementer 10 and the program counter PC is continuously incremented. On the other hand, the loop counter 26 is loaded with the value decremented by the decrementer 23, "0".

That forces the comparator 35 to set the flags f lc and the comparator 29 to reset the flag f exit.

Thus, the program control unit in accordance with the first preferred embodiment can recognize the start of the loop processing on the basis of the comparison result between the program counter value and the start address. Therefore, the loop instruction can be located at any place before the group of loop executing instructions in a program.

For example, as shown in FIG. 7, the loop instruction "loop lc, Start, End" for the group of loop executing instructions, loop block BlockB[i], is placed on line No. 21 even before the block BlockA.

Consequently, the problem caused by such a loop instruction placed between the block BlockA and the loop block BlockB as shown in FIG. 20 can be resolved. Since only three steps of the block BlockA for processing the border pixels are executed before the loop block BlockB and also one cycle of the loop block BlockB and the block BlockC each require three steps, any mask processing of one horizontal scanning can be performed by three steps. That enables a real-time processing of the complete frame.

In other words, placing the loop instruction in a location where it will not hinder the execution of the loop processing enables an efficient loop processing.

Figure 16:
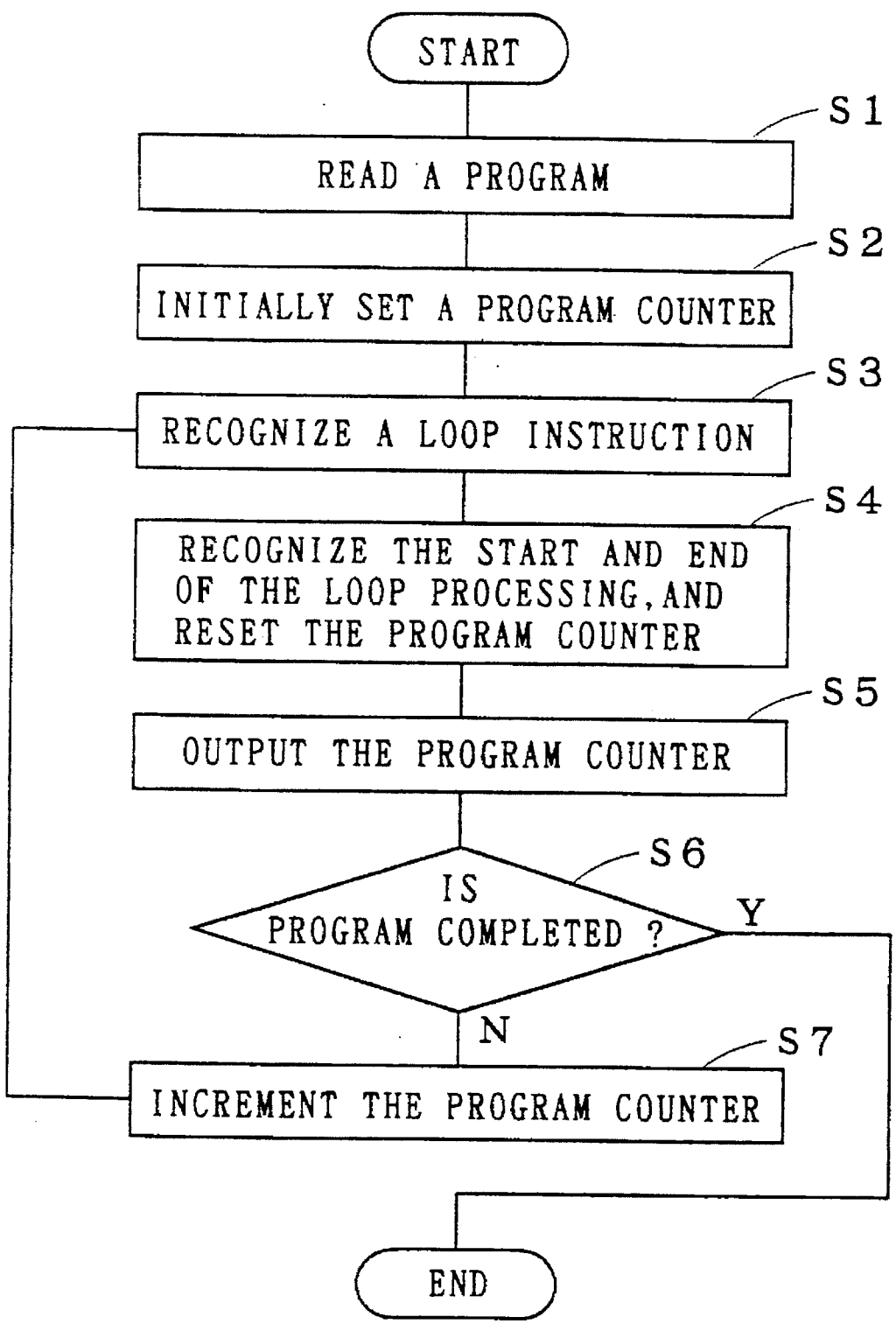
FIG. 16 is a flow chart of a program control method in accordance with a first preferred embodiment of the present invention.

FIG. 16 is a flow chart of a program control method, corresponding to the above program control unit, in accordance with the first preferred embodiment of the present invention.

Referring to FIG. 16, a program is read in Step S1, which contains a loop instruction to define registers storing a start address, an end address and the number of iterations of the loop processing and a group of loop executing instructions containing at least one loop executing instruction which is stored between the start address and the end address.

In Step S2, a program counter is set to the first address of the program which is read in Step S1.

In Step S3, if the instruction corresponding to the address indicated by the program counter is a loop instruction, the start address, the end address and the number of iterations thereof are recognized.

In Step S4, the start of a loop processing is recognized on the basis of the comparison result between the program counter and the start address which is stored in Step S3 and the end of the loop processing is recognized on the basis of the comparison result between the program counter and the end address which is stored in Step S3. Further if necessary, the program counter is reset at the start address of the loop processing so that the instructions of the group of the loop executing instructions should be executed the number of iterations times.

In Step S5, the current program counter is outputted to an instruction executing unit.

In Step S6, judgment is made as to whether the program counter indicates the end address or not, whether YES or NO. If the judgment is YES, the program is terminated, otherwise the step S7 follows.

In Step S7, the program counter is incremented before going back to the Step S3, and Steps S3 to S7 are repeated until the judgment of Step S6 is YES.

Thus, according to the program control method, the program counter is reset so that the group of loop executing instructions should be executed the number of iterations times by recognizing the start of the loop processing on the basis of the comparison result between the program counter and the start address and recognizing the end of the loop processing on the basis of the comparison result between the program counter and the end address in Step S4.

Therefore, the loop instruction can be located at any place before the group of loop executing instructions in the program.

Thus, placing the loop instruction in a location where it will not hinder the execution of the loop processing achieves an effect of performing an efficient loop processing.

Furthermore, the program control method of FIG. 16 is also applicable to other configurations than that of the program control unit of FIGS. 2 and 3, and to a software processing.

<The Second Preferred Embodiment>

FIG. 8 illustrates an example of a program which is controlled in its execution by a program control unit in accordance with the second preferred embodiment of the present invention. FIG. 8 shows a nesting structure of two loop blocks B11 and B12, corresponding to FIG. 18 in the background art.

In FIG. 8, loop instructions on line Nos, 21 and 23 independently designate the respective start addresses (Start__1, Start__2) and the respective end addresses (End__1 and End__2) of the two loop blocks.

Also in the case of executing loop instructions for nested loops, the loop instructions can be located at any place before the respective loop blocks.

The program control unit in accordance with the second preferred embodiment allows nested loops to be executed without interruption by a repetition of the individual loop instruction. That improves program performance and efficiency and enables a real-time processing.

To sustain the flexibility, the order of the loop counters is unconstrained, i.e., the loop block B12 can also be an outer loop in the program of FIG. 8.

Figure 9:
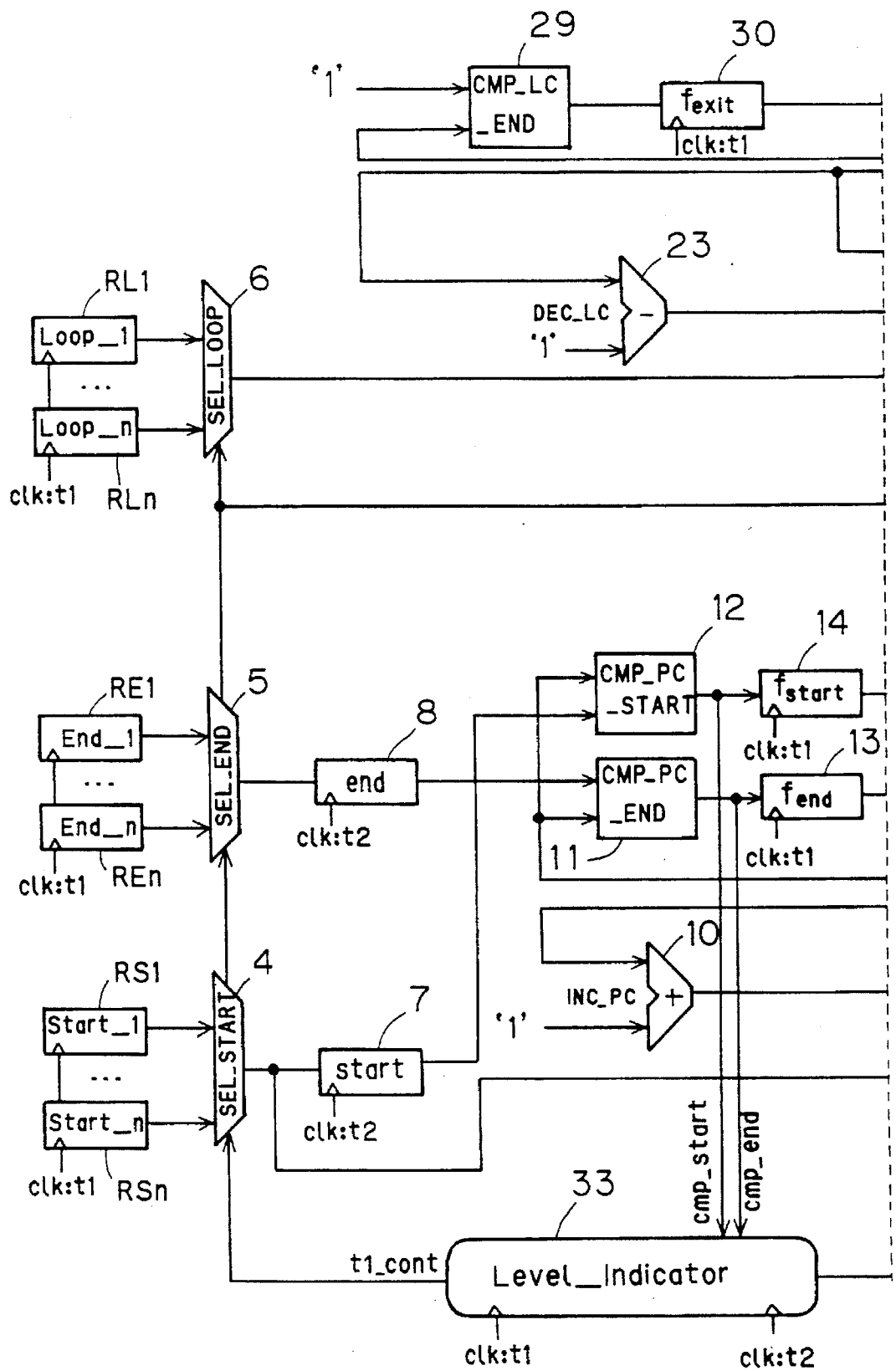
FIGS. 9 and 10 together are circuit diagrams cooperatively showing a configuration of the program control unit in accordance with the second preferred embodiment of the present invention.
Figure 10:
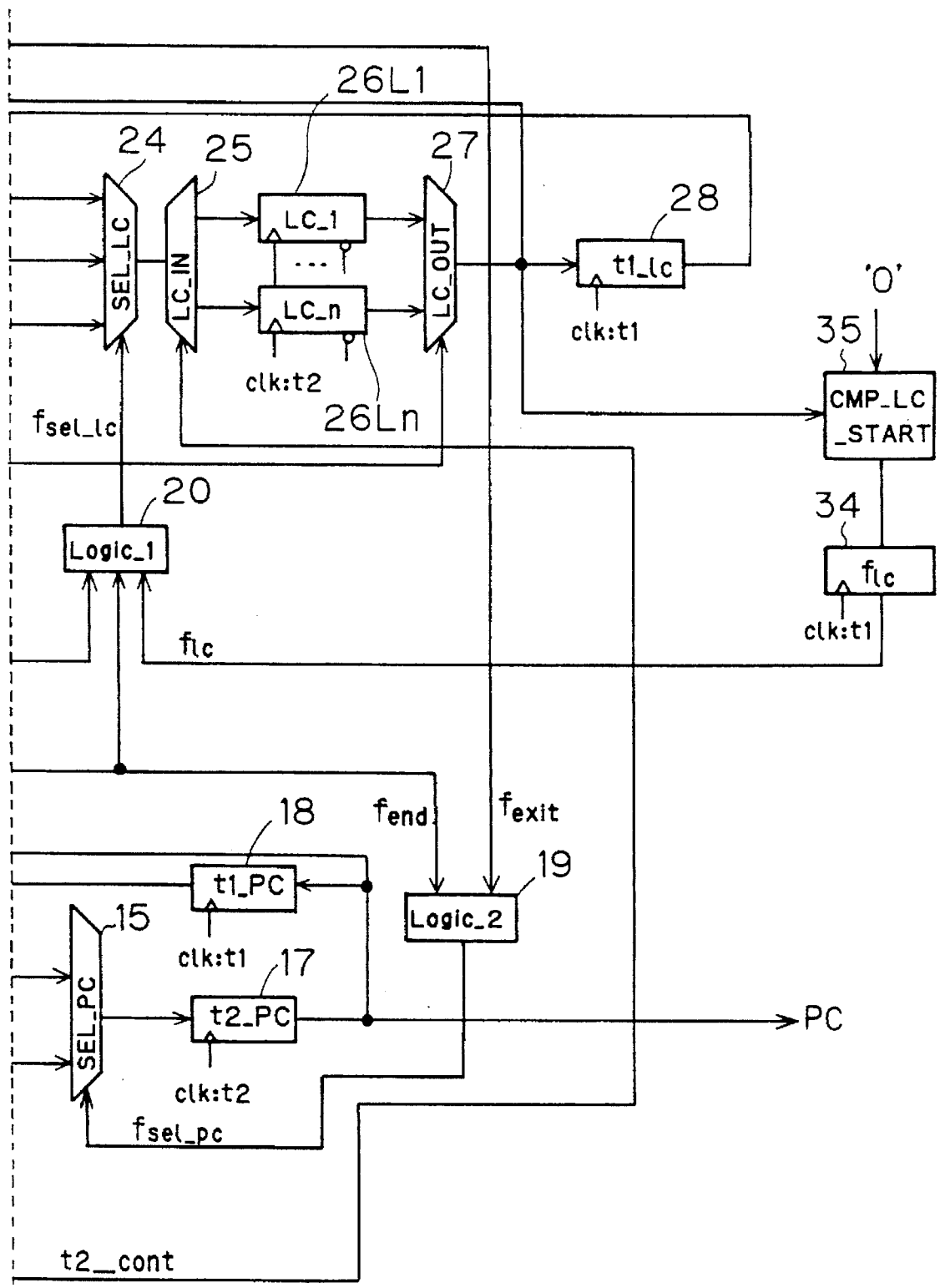
Figure 11:
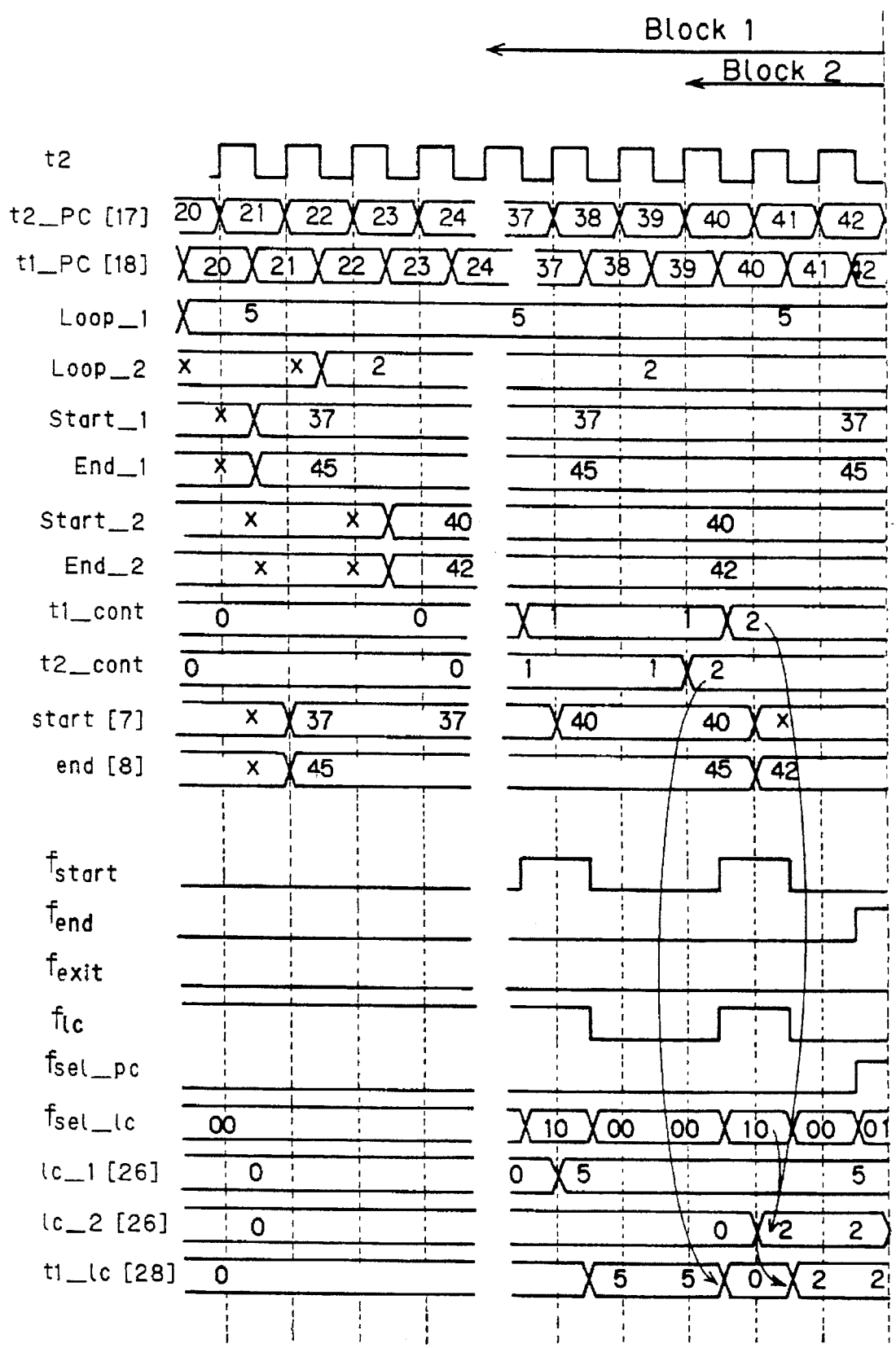
FIGS. 11, 12 and 13 together are waveform charts showing an operation of the program control unit in accordance with the second preferred embodiment of the present invention.
Figure 12:
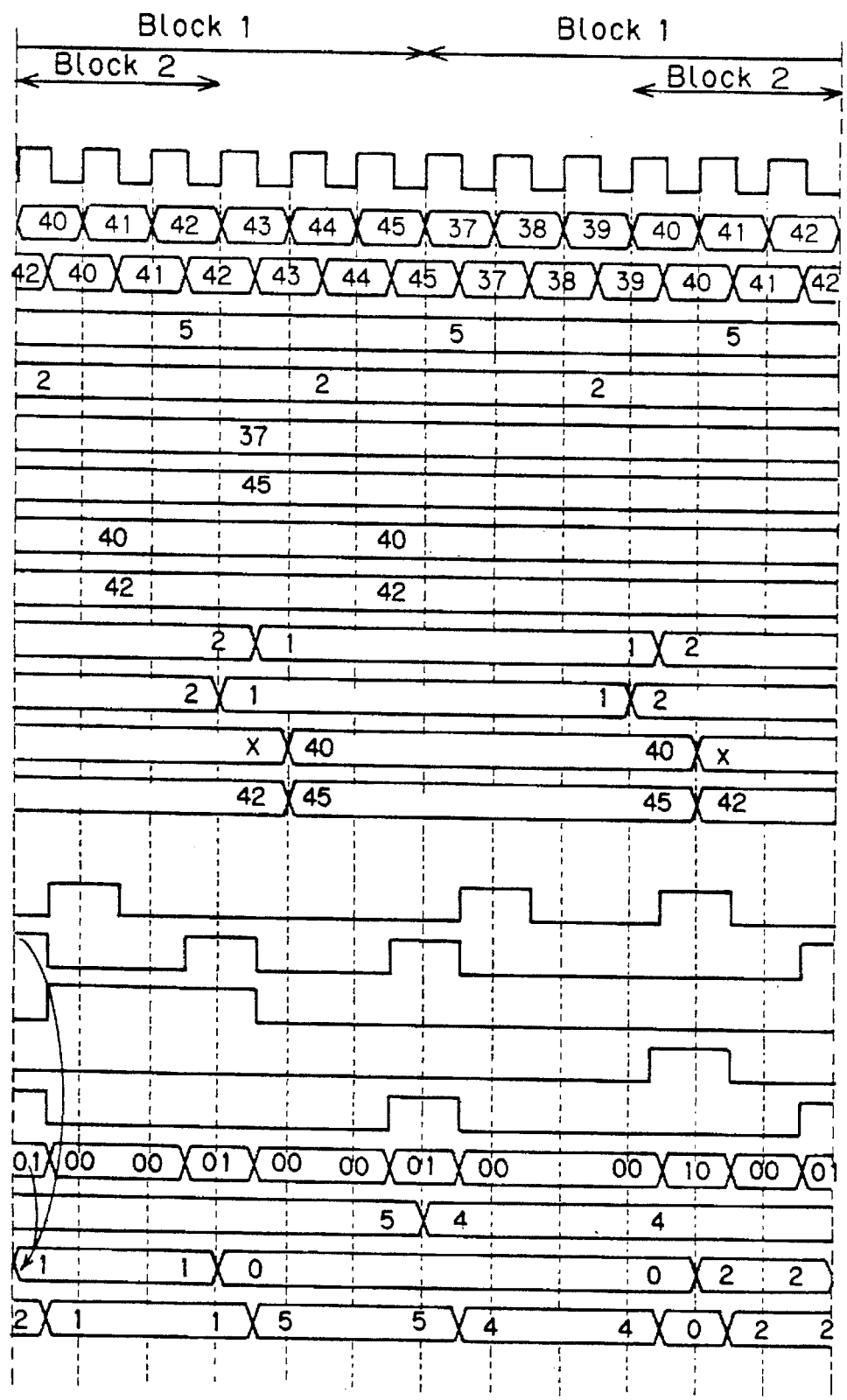
Figure 13:
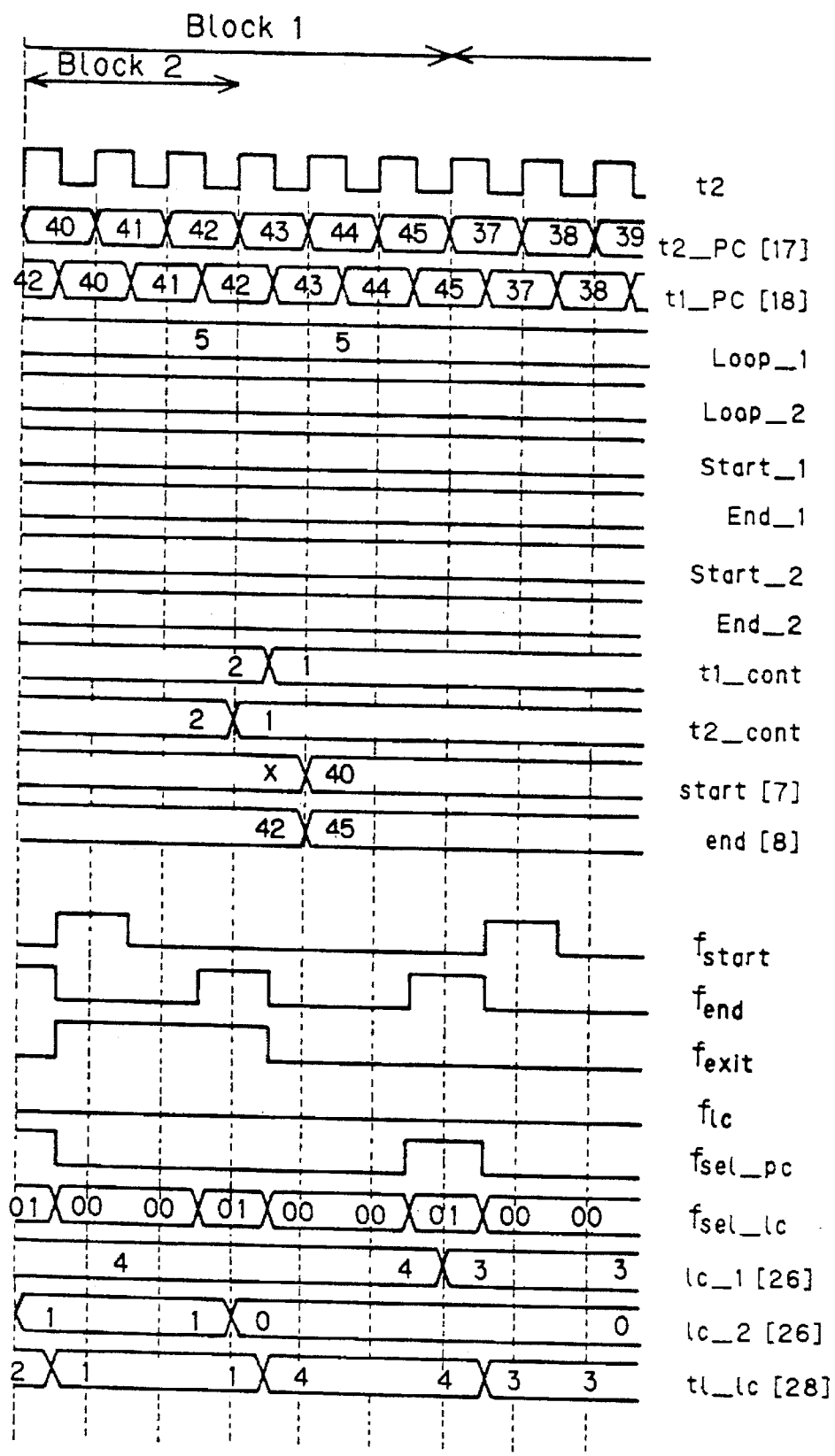

FIGS. 9 and 10 are circuit diagrams cooperatively showing an internal configuration of the program control unit in accordance with the second preferred embodiment of the present invention. The program control unit in accordance with the second preferred embodiment allows the nested loops of FIG. 8 to be executed. FIGS. 11 to 13 are waveform charts showing an operation thereof. Furthermore, FIGS. 11 to 13 show the execution of a program of FIG. 14. To improve the readability of the waveform, the loop counters are loaded with different values, i.e., "2" and "5".

In contrast to the straightforward implementation of a signal loop, nesting requires more registers, a nesting stack and additional control logic.

The respective start addresses of a plurality of nested loop processings are stored in registers RS1 (Start__1) to RSn (Start__n) (n≧2) with their outputs connected to a selector (SEL__START) 4. The respective end addresses of the nested loop processings are stored in registers RE1 (End__1) to REn (End__n) (n≧2) with their outputs connected to a selector (SEL__END) 5.

The selector 4 selects one of the stored data in the registers RS1 to RSn as a selected start address on the basis of a selection control signal t1__cont and outputs the selected start address to the register 7. The selector 5 selects one of the stored data in the registers RE1 to REn as a selected end address on the basis of the selection control signal t1__cont and outputs the selected end address to the register The respective numbers of iterations for the different loop processings are stored in registers RL1 (Loop__1) to RLn (Loop__n) with their outputs connected to a selector (SEL__ LOOP) 6. The selector 6 selects one of the stored data in the registers RL1 to RLn as a selected number of iterations on the basis of the selection control signal t1__cont and outputs the selected number of iterations to the selector 24.

As for the timing, the respective data in the registers RL1 to RLn, RS1 to RSn and RE1 to REn are latched in synchronization with the clock t1, and the selected start address in the register 7 and the selected end address in the register 8 are latched in synchronization with the clock t1.

After outputting the data from the registers 7 and 8, the program control unit of FIGS. 9 and 10 uses the same configuration as that of FIGS. 2 and 3.

Also the variable loop counters 26L1 to 26Ln has to be adjusted to the multilevel nesting, that is, n variable loop counters are provided.

The hierarchy is maintained simple by multiplexing, resp. demultiplexing the variable loop counters 26L1 to 26Ln. Therefore, the selector 25 (LC__IN) demultiplexes the output from the selector 24 (SEL__LC), and the outputs from the selector 25 are latched into the variable loop counters 26L1 to 26Ln in synchronization with the clock 12. The selector 27 (LC__OUT) multiplexes the outputs from the variable loop counters 26L1 to 26Ln and the output from the selector 27 (LC__OUT) is latched into register 28 (t1__lc).

A level indicator 33 receives the clocks t1 and 12 and the outputs cmp__start and cmp__end from the comparators 12 and 13, and outputs the selection control signals t1__cont and t2__cont. A truth table of the control system of the level indicator 33 is shown in Table 3. The value "0" is given to the selection control signals t1__cont and t2__cont by default. Furthermore, in Table 3, the values of cmp__end is given before one cycle of the clock 12 (t1), as compared with the values of cmp__start.

TABLE 3

| cmp__start | cmp__end {delayed for 1 cycle !!!} | Function |
|---|---|---|
| 0 | 0 | Hold |
| 1 | 0 | Increment |

TABLE 3-continued

| cmp_start | cmp_end {delayed for 1 cycle !!!} | Function |
| --- | --- | --- |
| 0 | 1 | Decrement |
| 1 | 1 | Hold |

As is clear from Table 3, the selection control signals t1_cont and t2_cont are held when both of cmp_start and cmp_end are "0" or "1", incremented when cmp_start is "1" and cmp_end is "0" and decremented when cmp_start is "0" and cmp_end is "1".

The selectors 4 to 6 and 27 perform selections on the basis of the selection control signal t1_cont outputted from the level indicator 33. Table 4 shows the selection system of the selectors 5, 6 and 27 and Table 5 shows the selection system of the selector 4.

TABLE 4

| t1_cont | Action |
| --- | --- |
| 0 | ???_1 → Output |
| 1 | ???_1 → Output |
| 2 | ???_2 → Output |
| . | . |
| n | ???_n → Output |

??? = END, LOOP or LC

TABLE 5

| t1_cont | Action |
| --- | --- |
| 0 | Start_1 → Output |
| 1 | Start_2 → Output |
| 2 | Start_3 → Output |
| . | . |
| n−1 | Start_n → Output |
| n | '0' → Output |

As is clear from Table 4, the selectors 5, 6 and 27 output the stored data in the register RE1, the register RL1 and the variable loop counter 26L1, respectively, when the selection control signal t1_cont is "0", and output the stored data in the register REi, the register RLi and the variable loop counter 26Li, respectively, when the selection control signal t1_cont is i (i=1 to n).

As is clear from Table 5, the selector 4 outputs the stored data in the register RS(j+1) when the selection control signal t1_cont is j (j=0 to (n−1)), and outputs "0" when the selection control signal t1_cont is n.

The selector 25 performs a selection on the basis of the selection control signal t2_cont outputted from the level indicator 33. Table 6 shows the selection system of the selector 25.

TABLE 6

| t2_cont | Action |
| --- | --- |
| 0 | LC_1 → Output |
| 1 | LC_1 → Output |

TABLE 6-continued

| t2_cont | Action |
| --- | --- |
| 2 | LC_2 → Output |
| . | . |
| n | LC_n → Output |

As is clear from Table 6, the selector 25 outputs data to the variable loop counter 26L1 when the selection control signal t2_cont is "0", and outputs data to the variable loop counter 26Li when the selection control signal t2_cont is i (i=1 to n).

By default, both of the selection control signals t1_cont and t2_cont are "0", emulating a single loop.

As illustrated in the waveform charts of FIGS. 11 to 13, the selection control signals t1_cont and t2_cont indicate the current level of nesting, the selectors 4, 5 and 6 select the stored data in the registers RL1 to RLn, the registers RE1 to REn and the registers RS1 to RSn on the basis of the selection control signal t1_cont.

The tricky part is the handling of the variable loop counters 26L1 to 26Ln. The selector 25 stores the output from the selector 24 into one of the variable loop counters 26L1 to 26Ln on the basis of the selection control signal t2_cont, and the selector 27 outputs one of the stored data in the variable loop counters 26L1 to 26Ln to the register 28 on the basis of the selection control signal t1_cont.

As mentioned above, the selectors 4 to 6, 25 and 27 multiplex or demultiplex the stored data in the registers RS1 to RSn, RE1 to REn, RL1 to RLn and the variable loop counters 26L1 to 26Ln, respectively, on the basis of the selection control signals t1_cont and t2_cont, thereby handling well the loop instructions for the nested loops.

In the program control unit of the second preferred embodiment, the configuration and operation other than the above are the same as that of the first preferred embodiment, and discussion thereof will be omitted.

Since the program control unit of the second preferred embodiment enables indication of the current loop processing by the selection control signals t1_cont and t2_cont outputted from the level indicator 33 and recognition of the start of the loop processing on the basis of the comparison result between the program counter and the selected start address, the first to n-th loop instructions can be located at any place before the respective first to n-th groups of loop executing instructions.

For example, as shown in FIG. 14, the first loop instruction "loop lc1, Start_1, End_1" for the first group of loop executing instructions Block1 to Block3 is placed on line No. 21 and the second loop instruction "loop lc2, Start_2, End_2" for the second group of loop executing instructions Block2 is placed on line No. 23, before the first and second groups of loop executing instructions.

Consequently, the problem caused by the first and second loop instructions placed inside the nesting structure of the first and second groups of loop executing instructions of FIG. 18 can be solved, and the second loop instruction is executed only once regardless of the iterations of the first loop instruction.

Placing the first to n-th loop instructions outside the nesting structure of the first to n-th groups of loop executing instructions enables an efficient processing of the nested first to n-th loops.

While the invention has been shown and described in detail, the foregoing description is in all aspects illustrative and not restrictive. It is therefore understood that numerous modifications and variations can be devised without departing the scope of the invention.

We claim:

1. A program control unit for controlling execution of a program which contains a plurality of instructions each having a corresponding address, said program control unit requiring that a loop instruction defining a start address, an end address and the number of iterations of a loop processing and a group of loop executing instructions containing at least one instruction located between said start address and said end address are located in said program to perform said loop processing, wherein said loop processing may not immediately follow said loop instruction, comprising:

program counter output means for incrementing a program counter defining an address of the current instruction at prescribed time intervals and outputting said incremented program counter;

start address storage means for storing said start address from said loop instruction;

end address storage means for storing said end address from said loop instruction;

number of iterations storage means for storing said number of iterations from said loop instruction; and loop control means for setting said program counter so that said group of loop executing instructions should be repeated said number of iterations times by recognizing the start of said loop processing on the basis of a comparison result between said program counter and said start address and the end of said loop processing on the basis of a comparison result between said program counter and said end address.

2. The program control unit of claim 1, wherein said program counter output means includes incrementing means for incrementing said program counter in synchronization with a prescribed clock.

3. The program control unit of claim 2, wherein said loop control means includes start address comparing means for comparing said program counter with said start address and outputting a start address comparison result indicating agreement/disagreement; and end address comparing means for comparing said program counter with said end address and outputting an end address comparison result indicating agreement/disagreement.

4. The program control unit of claim 3, wherein said loop control means further includes remaining execution count storage means for storing remaining execution count of the number of iterations in said loop processing, in which said remaining execution count is set at "0" as an initial value;

loop start control means for setting said remaining execution count at said number of iterations when said start address comparison result indicates agreement and said remaining execution count is "0"; and remaining execution count control means for decrementing said remaining execution count after setting said program counter at said start address when said end address comparison result indicates agreement and said remaining execution count is more than "0".

5. A program control unit for controlling execution of a program which contains a plurality of instructions each having a corresponding address, said program control unit requiring that first to n-th (n≥2) loop instructions defining respective start addresses, respective end addresses and respective numbers of iterations of first to n-th loop processings which are nested in first to n-th order and first to n-th groups of loop executing instructions each containing at least one instruction located between said start address and said end address in said respective first to n-th loop instructions are located in said program to perform said loop processings, wherein said n-th loop processings may not immediately follow said first to n-th loop instructions, comprising:

program counter output means for incrementing a program counter defining an address of the current instruction at prescribed time intervals and outputting said incremented program counter;

first to n-th start address storage means for storing said start addresses of said first to n-th loop processings from said loop instructions as first to n-th start addresses respectively;

first to n-th end address storage means for storing said end addresses of said first to n-th loop processings from said loop instructions as first to n-th end addresses respectively;

first to n-th numbers of iterations storage means for storing said numbers of iterations of said first to n-th loop processings from said loop instructions as first to n-th numbers of iterations respectively; and start address selecting means for selecting one of said first to n-th start addresses as a selected start address on the basis of a selection control signal;

end address selecting means for selecting one of said first to n-th end addresses as a selected end address on the basis of said selection control signal;

number of iterations selecting means for selecting one of said first to n-th numbers of iterations as a selected number of iterations on the basis of said selection control signal;

selection control signal output means for outputting said selection control signal indicating a current loop processing on the basis of a comparison result between said program counter and said selected start address and a comparison result between said program counter and said selected end address; and loop control means for setting said program counter so that said current loop processing should be repeated said selected number of iterations times by recognizing the start of said loop processing corresponding to said selected start address on the basis of said start address comparison result and the end of said loop processing corresponding to said selected end address by said address comparison result.

6. The program control unit of claim 5, wherein said program counter output means includes incrementing means for incrementing said program counter in synchronization with a prescribed clock.

7. The program control unit of claim 6, wherein said loop control means includes start address comparing means for comparing said program counter with said selected start address and outputting a star address comparison result indicating agreement/disagreement; and end address comparing means for comparing said program counter with said end address and outputting an end address comparison result indicating agreement/disagreement.

8. The program control unit of claim 3, wherein said loop control means further includes first to n-th remaining execution count storage means for storing respective remaining execution counts of said iterations of first to n-th loop processings, in which said first to n-th remaining execution counts are set at "0" respectively as initial values;

remaining execution count selecting means for selecting one of said first to n-th remaining execution counts as a selected remaining execution count on the basis of said selection control signal;

loop start control means for setting said selected remaining execution count at said selected number of iterations when said start address comparison result indicates agreement and said selected remaining execution count is "0"; and remaining execution count control means for decrementing said selected remaining execution count after setting said program counter at said selected start address when said end address comparison result indicates agreement and said remaining execution count is more than "0".

9. The program control unit of claim 8, wherein said selection control signal output means for outputting said selection control signal by recognizing the start and end of said loop processing which is nested on the basis of said start address comparison result and said end address comparison result.

10. A program control method of controlling executing of a program which contains a plurality of instructions each having a corresponding address, said program control method requiring that a loop instruction defining a start address, an end address and the number of iterations of a loop processing and a group of loop executing instructions containing at least one instruction located between said start address and said end address are located in said program to perform said loop processing, wherein said loop processing may not immediately follow said loop instruction, comprising the steps of:

(a) incrementing a program counter which defines an address of the current instruction at prescribed time intervals from a first address of said program;

(b) storing said start address, said end address and said number of iterations from said loop instruction when an instruction corresponding to an address which is indicated by said program counter is said loop instruction;

(c) setting said program counter so that said group of loop executing instructions should be repeated said number of iterations times by recognizing the start of said loop processing on the basis of a comparison result between said program counter and said start address stored in said step (b) and the end of said loop processing on the basis of a comparison result between said program counter and said end address stored in said step (b).

* * * * *